J. T. PEED.
ANTISKID DEVICE.
APPLICATION FILED DEC. 17, 1917.
1,407,711.
Patented Feb. 28, 1922.
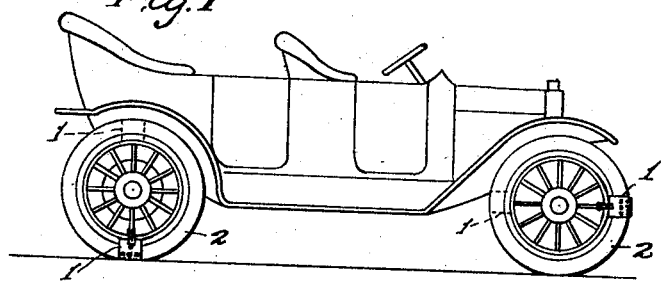
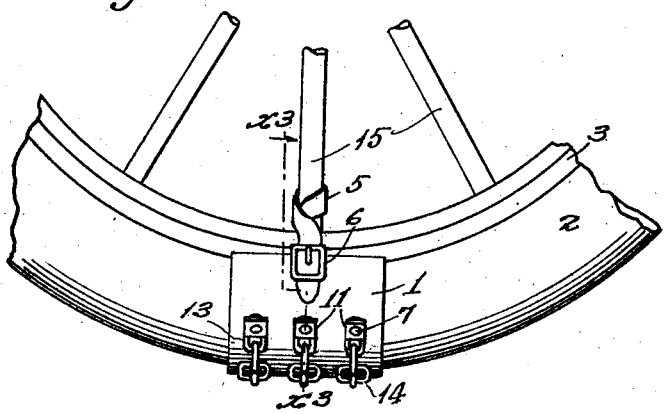
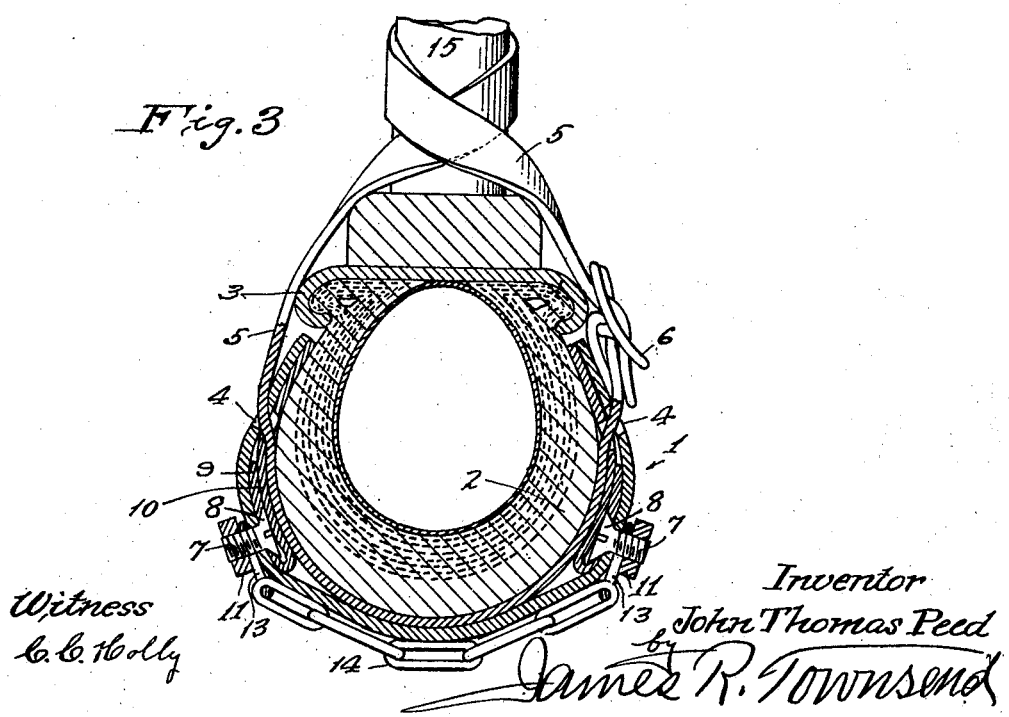
Witness
C. C. Holly
Inventor
John Thomas Peed
by
James R. Townsend

UNITED STATES PATENT OFFICE.

JOHN THOMAS PEED, OF PASADENA, CALIFORNIA.

ANTISKID DEVICE.

1,407,711.  Specification of Letters Patent.  Patented Feb. 28, 1922.

Application filed December 17, 1917. Serial No. 207,804.

*To all whom it may concern:*

Be it known that I, JOHN THOMAS PEED, a citizen of the United States, residing at 1183 Avoca Avenue, city of Pasadena, in the county of Los Angeles and State of California, have invented a new and useful Antiskid Device, of which the following is a specification.

An object of this invention is to provide a cheap, simple and effective device for preventing automobiles from skidding.

A further object is to provide a device of this character which can be applied to an automobile with maximum ease and expedition, so that when occasion to supply the wheels with the anti-skid device arises, as in the case of a sudden storm that makes the road slippery, the driver can apply the device in a few moments and can, afterwards, at pleasure, quickly remove the same.

I have discovered that in order to prevent the wheels of an automobile from skidding, it is unnecessary that the anti-skid device shall extend entirely around the periphery of the wheel as in practice heretofore, and a feature of this invention is the provision of a short patch-like arrangement attached to the wheel and covering only a comparatively small portion of the wheel and separated from any other anti-skid device by a space not less than that equal to one-quarter of the circumference of the wheel; and in actual practice I prefer to apply not more than two of such devices to any one wheel, thus economizing without loss of efficiency; and I find also that by fitting each of two or more wheels of the vehicle with only one non-skid device, perfect security against skidding is provided for. It may sometimes be found desirable to apply the anti-skid device to all four wheels of the vehicle and in such case only one anti-skid device need be applied to any one wheel.

Where two of the devices are applied to a single wheel, as shown in Fig. 1 wherein the second patch on each of the wheels exposed to view is indicated by dotted lines, they will be diametrically opposite each other, and if for any reason four anti-skid devices, not shown, should be applied to one wheel they would be applied equidistant from each other.

A further object of the invention is to provide a cheap, strong, anti-skid device for pneumatic tires.

A distinct novelty and object of my invention is also to provide such an anti-skid device with auxiliary anti-skid means that are quickly and easily attached to, and quickly and easily detached from, the device, said auxiliary means, when required, being removable and exchangeable without necessitating the removal of the device from, or the loosening of the device on, the periphery of the wheel, and, in one form of the invention serving as means whereby the main anti-skid means are detachably fastened to the device, so that, if said latter means have been worn beyond effective usage, they, too, may be removed and exchanged without necessitating removal or loosening of the device.

Further objects, advantages and features of invention may appear from the accompanying drawings, the subjoined detail description and the appended claims.

The accompanying drawing illustrates the invention.

Figure 1 is a diagrammatic view of an automobile provided with an anti-skid device in accordance with this invention.

Fig. 2 is a fragmental side view of a wheel provided with my anti-skid device.

Fig. 3 is an enlarged fragmental section on line $x^3$, Fig. 2.

The backing 1 is preferably made of sole leather and is of such a length as to allow it to be wrapped far enough around the pneumatic tire 2 to cover the portion of the pneumatic tire that is subject to contact with the road for the width of the patch. It may extend about all the way across the space between the opposite sides of the wheel rim 3. Said backing is provided on opposite sides of its center and at equal distances from the ends respectively, with slots 4 through which a flexible connection as the strap 5, having fastening means as the buckle 6 is inserted. Said backing is provided on its outer face with non-skid projections which may be of various forms as is indicated in the various views. In Fig. 3 there are shown adjacent to the slots 4 bolts 7, having heads 8 intermediate the folds 9, 10 of a reinforcement on the inner side of the backing. Such reinforcement may be, and is shown as, folded; the bolt 7 being inserted through the outer band 9, and its head is covered over by the inner band 10 of the reinforcement, so that the head of the bolt will not work any destruction to the walls of the pneumatic tire 2. The inner band 10 may, and is shown as extending upwardly and the strap 5 passes therethrough, thereby insuring the reinforcement being held in place. Nuts 11 are screwed tightly onto said bolt on the outside of the backing.

In the form shown in Figs. 2 and 3, the nuts 7 clamp end links 13 of chains 14 that extend across the tread of the tire and constitute the anti-skid means that contact with the street surface when the tire is under ordinary load.

Under heavy loads or with a flattened tire, the nuts 11 may also engage the track or road surface and thus serve as anti-skid means auxiliary to the projections 12 or the chains 14.

To apply the device to the wheel it is only necessary to bend the sole leather piece 1 on the surface of the tire adjacent a spoke 15, and then wrap the strap 5 around said spoke and secure it by the buckle 6.

I find in actual practice that a comparatively slight fastening such as is indicated in the drawings by the strap 5 and buckle 6 is sufficient to hold the backing in place, for the reason that the friction of the inside of the backing upon the strap 5 and upon the rubber of the tire is sufficient, under load, to hold the device from slipping on the pneumatic tire 2.

From the foregoing description it is readily seen that I have produced an exceedingly simple, convenient and time-saving anti-skid device, particularly because the nuts 11, being quickly and easily attached to the bolts 7 and also quickly and easily detached therefrom, are quickly and easily attached to, and quickly and easily detached from, the patch 1, and therefore, whenever required can be removed and exchanged without necessitating the removal of the patch from, or the loosening of the patch on, the tire 2, and because in the form of my invention shown in Figs. 2 and 3 the bolt and nut connections serve as means for detachably fastening the anti-skid chains 14 to the patch 1 and thereby also dispense with the necessity of removing the patch from, or loosening the patch on, the tire, whenever it is required to remove the chains and to exchange them.

I claim:

1. An anti-skid device comprising a flexible backing adapted to be removably attached to the wheel of a vehicle; anti-skid chains adapted to be removably attached on the outside of said backing; a flexible connection for attaching and detaching the backing to the periphery of the wheel; bolts extending through the backing near both sides thereof; each pair of bolts at opposite sides of the backing being adapted to hold the ends of a respective chain; and nuts adapted to be screwed on the bolts for securing the anti-skid chains to the backing, said nuts being adapted to serve as auxiliary anti-skid means that can be quickly and easily attached to or removed from said backing without necessitating the loosening of the backing when attached to the periphery of the wheel, and a reinforcement fastened to and between said nut and bolt connections to avoid destruction of a tire on said wheel.

2. An anti-skid attachment, comprising a flexible backing; flexible means adapted to removably attach said backing to a wheel of a vehicle; anti-skid devices arranged on one side of said backing; a reinforcement on the other side of said backing; attaching means extending through said backing and one end of said reinforcement for removably attaching said anti-skid devices to said backing, whereby said anti-skid devices may be easily and quickly attached to or removed from said backing while said backing is held on the periphery of said wheel; and the other end of said reinforcement being folded over the attached end thereof and said attaching means for the purpose set forth.

3. An anti-skid attachment, comprising a flexible backing, flexible means adapted to removably attach said backing to a wheel of a vehicle; anti-skid devices arranged on one side of said backing; a reinforcement on the other side of said backing; attaching means extending through said backing and one end of said reinforcement for removably attaching said anti-skid devices to said backing, whereby said anti-skid devices may be easily and quickly attached to or removed from said backing while said patch is held on the periphery of said wheel; and the other end of said reinforcement being folded over the attached end thereof and said attaching means for the purpose set forth and extends upwardly and around said flexible means so as to be held in place.

In testimony whereof, I have hereunto set my hand at Los Angeles, California, this 10th day of December 1917.

JOHN THOMAS PEED.

Witness:
JAMES R. TOWNSEND.